US012726088B2

(12) United States Patent
Hubert et al.

(10) Patent No.: US 12,726,088 B2
(45) Date of Patent: Sep. 1, 2026

(54) INTERNALLY SHUNTING GROUNDING BRUSH ASSEMBLY WITH AXIALLY-EXTENDING CONDUCTIVE FIBERS

(71) Applicant: AKTIEBOLAGET SKF, Gothenburg (SE)

(72) Inventors: Mathieu Hubert, Ann Arbor, MI (US); Gene Arthur Kovacs, Brighton, MI (US); David Christopher Rybski, White Lake, MI (US); Alberto Carlevaris, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 170 days.

(21) Appl. No.: 18/925,378

(22) Filed: Oct. 24, 2024

(65) Prior Publication Data

US 2026/0018978 A1 Jan. 15, 2026

(30) Foreign Application Priority Data

Jul. 11, 2024 (IT) ........................ 102024000016096

(51) Int. Cl.
*H02K 11/40* (2016.01)
*H01R 39/24* (2006.01)

(52) U.S. Cl.
CPC ............ *H02K 11/40* (2016.01); *H01R 39/24* (2013.01)

(58) Field of Classification Search
CPC ................................ H02K 11/40; H01R 39/24
See application file for complete search history.

(56) References Cited

U.S. PATENT DOCUMENTS

2019/0296617 A1 9/2019 Hubert et al.
2022/0255407 A1 8/2022 Chen et al.
(Continued)

FOREIGN PATENT DOCUMENTS

CN 214543908 U 10/2021
CN 113949218 A 1/2022
(Continued)

OTHER PUBLICATIONS

Unpublished U.S. Appl. No. 18/925,344, first named inventor: Mathieu Hubert, filed Oct. 24, 2024.
(Continued)

*Primary Examiner* — Joseph Ortega
(74) *Attorney, Agent, or Firm* — J-TEK LAW PLLC; Scott T. Wakeman; Mark A. Ussai

(57) ABSTRACT

A grounding brush assembly for an electric machine which includes a rotatable, an outer housing, one or more bearings coupling the shaft with the housing, and a fixed shaft extending through the rotatable shaft and electrically grounded. The grounding brush assembly includes an inner conductive base member having a bore sized to receive a portion of the fixed shaft and a radial surface. An outer conductor is engageable with the inner circumferential surface of the rotatable shaft and has a radial contact surface. A conductive brush is coupled with the base member and includes a plurality of conductive fibers extending axially from the radial surface of the base member and circumferentially about the centerline, each conductive fiber having an first axial end coupled with the base member and an opposing second axial end engaged with the radial surface of the outer conductor to provide a conductive path or paths.

20 Claims, 6 Drawing Sheets

(56) References Cited

U.S. PATENT DOCUMENTS

| | | | | |
|---|---|---|---|---|
| 2022/0294319 | A1 | 9/2022 | Arnault et al. | |
| 2023/0170658 | A1* | 6/2023 | Viault | H01R 39/24 310/239 |
| 2024/0055959 | A1 | 2/2024 | Zhou et al. | |
| 2024/0128839 | A1 | 4/2024 | Kim | |

FOREIGN PATENT DOCUMENTS

| | | | | | |
|---|---|---|---|---|---|
| CN | 113949221 | A | * | 1/2022 | H02K 5/163 |
| CN | 217282471 | U | | 8/2022 | |
| CN | 115940524 | A | * | 4/2023 | |
| DE | 102019202844 | A1 | | 9/2019 | |
| DE | 102022202004 | A1 | | 9/2022 | |
| DE | 102023100970 | A1 | | 2/2024 | |
| JP | 2016119760 | A | | 6/2016 | |
| WO | 2018196924 | A1 | | 11/2018 | |

OTHER PUBLICATIONS

Unpublished U.S. Appl. No. 18/925,359, first named inventor: Mathieu Hubert, filed Oct. 24, 2024.

Unpublished U.S. Appl. No. 18/925,371, first named inventor: Mathieu Hubert, filed Oct. 24, 2024.

Written Opinion and Search Report from the Italian Patent Office mailed Jan. 15, 2025 in related application No. IT 102024000016096.

* cited by examiner

INTERNALLY SHUNTING GROUNDING BRUSH ASSEMBLY WITH AXIALLY-EXTENDING CONDUCTIVE FIBERS

CROSS-REFERENCE

This application claims priority to Italian patent application no. 102024000016096 filed on Jul. 11, 2024, the contents of which are fully incorporated herein by reference.

BACKGROUND OF THE INVENTION

The present invention relates to grounding devices for bearings, and more particularly to grounding brush assemblies for shunting current away from bearings.

In electric machines, such as an electric motor, a generator, etc., the machine typically includes a shaft rotatable about a central axis, an outer housing and at least one bearing connecting the shaft to a housing. Such bearings generally include an inner ring mounted on the rotatable shaft, an outer ring disposed about the inner ring and engaged with the housing, and a plurality of rolling elements disposed between the inner and outer rings. During operation, electric charge may accumulate on the shaft, which can generate an electric current that passes from the shaft, through the bearing and into the outer housing. These currents can cause damage to the raceways of the inner and outer rings as well as the rolling elements.

In order to avoid damage to the bearings, it is known to provide a grounding brush assembly that provides a conductive path between the shaft and the housing in order to shunt current away from the bearing(s). Such a grounding brush assembly typically includes a bracket or holder connected with the housing and a brush attached to the bracket/holder and including a plurality of conductive fibers extending radially inwardly from the holder and contacting the outer surface of the shaft, or a sleeve or other member mounted on the shaft. Alternatively, the holder may be mounted on the shaft and have a plurality of radially-outwardly directed fibers engaged with an inner circumferential surface of the housing.

SUMMARY OF THE INVENTION

In one aspect, the present invention is a grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded. The grounding brush assembly comprises an annular inner conductive base member having a bore sized to receive a portion of the fixed shaft and a centerline coaxially alignable with the central axis. An annular outer conductor is engageable with the inner circumferential surface of the rotatable shaft and a conductive brush is coupled with the conductive base member and includes a plurality of conductive fibers extending axially along and circumferentially about the centerline. Each conductive fiber has a first axial end coupled with the base member and an opposing second axial end engaged with the outer conductor such that at least one conductive path extends from the rotatable shaft, through the outer conductor, the brush and the base member, and to the fixed shaft.

Preferably, the conductive base member includes an annular hub having an inner circumferential surface providing the bore of the base member and a radial flange extending radially outwardly from the hub, the conductive brush being attached to the radial flange of the base member. The outer conductor preferably includes an axial portion engageable with the rotatable shaft so as to couple the outer conductor with the rotatable shaft and a radial flange extending radially inwardly from the axial portion, the second axial end of each one of the plurality of conductive fibers of the conductive brush being engaged with the radial flange of the outer conductor.

Further, the conductive brush preferably includes an annular retainer with a circumferential channel, the first axial end of each one of the plurality of conductive fibers being disposed within the circumferential channel and the radial flange of the conductive base member includes at least one and preferably a plurality of retainer tabs each engaged with the annular retainer of the conductive brush to couple the brush with the base member. Furthermore, the grounding brush assembly preferably further comprises at least one centering bearing having an inner ring disposable about the fixed shaft and an outer ring engaged with the inner circumferential surface of the rotatable shaft, the at least one centering bearing being disposed against or spaced axially apart from the base member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
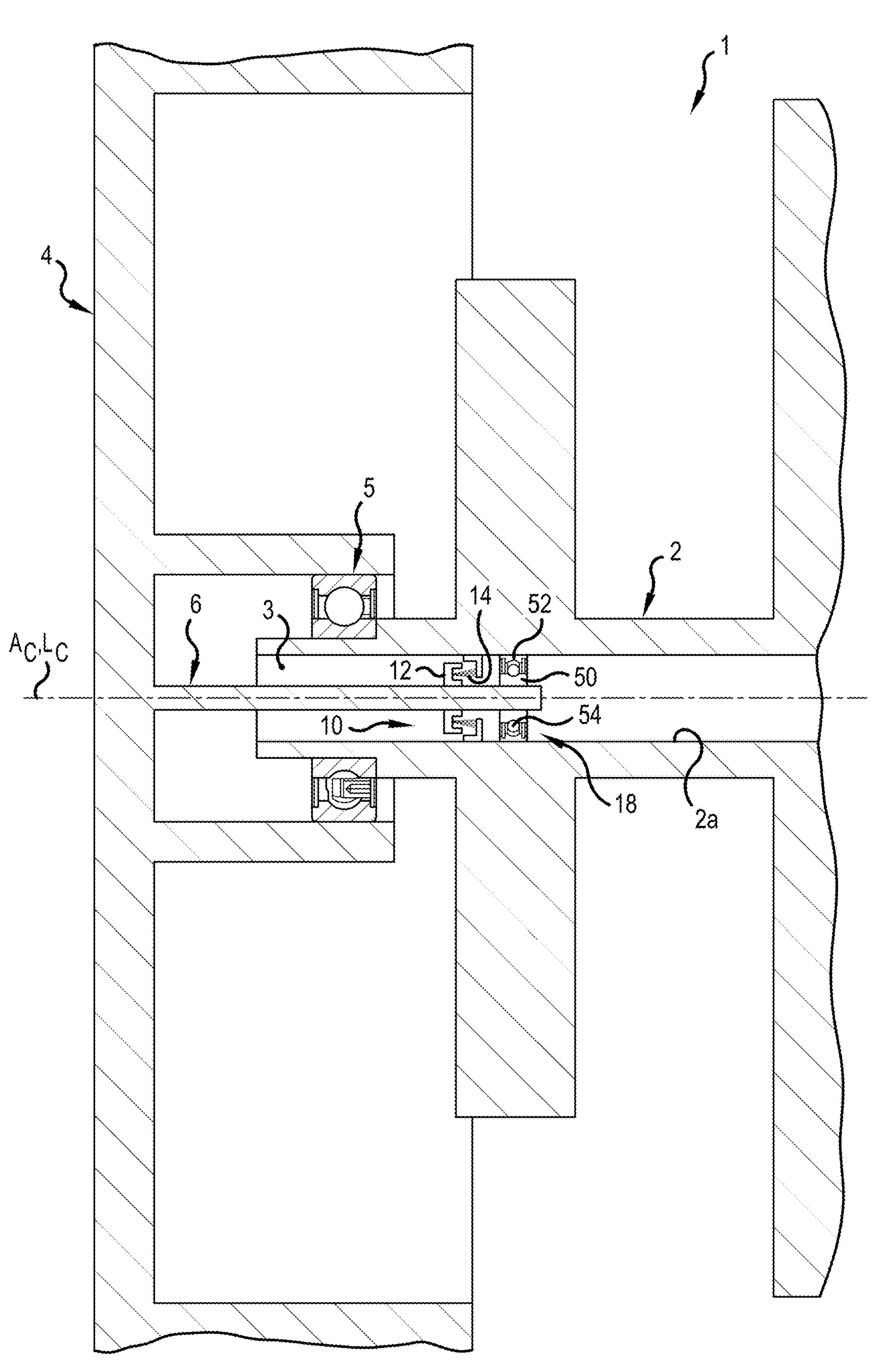
FIG. 1 is an axial cross-sectional view of an electric machine including a grounding brush assembly in accordance with the present invention.

Certain terminology is used in the following description for convenience only and is not limiting. The words “inner”, “inwardly” and “outer”, “outwardly” refer to directions toward and away from, respectively, a designated centerline or a geometric center of an element being described, the particular meaning being readily apparent from the context of the description. Further, as used herein, the words “connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a grounding brush assembly 10 for an electric machine 1. The electric machine 1 includes a rotatable shaft 2 rotatable about a central axis $A_C$ and having an inner circumferential surface 2*a* defining a hollow bore 3, an outer housing 4, at least one bearing 5 rotatably coupling the shaft 2 with the housing 4, and a fixed shaft 6 extending through the bore 3 of the rotatable shaft 2 and being electrically grounded. The grounding brush assembly 10 basically comprises an inner conductive base member 12 disposed about the fixed shaft 6, an outer conductor 14 coupleable with the rotatable shaft 2 and a conductive brush 16 coupled with the base member 12 and engaged with the outer conductor 14, and preferably further includes at least one centering bearing 18 for centering the rotatable shaft 2 about the fixed shaft 6.

More specifically, the conductive base member 12 has a bore 13 sized to receive a portion of the fixed shaft 6 so as to couple the grounding brush assembly 10 with the fixed shaft 6 and a centerline Le extending through the bore 13 and coaxially alignable with the central axis $A_C$. The annular outer conductor 14 is engageable with the inner circumferential surface 2*a* of the rotatable shaft 2 so as to couple the conductor 14 with the shaft 2. The conductive brush 16 is coupled with the base member 12 and includes a plurality of conductive fibers 20 extending axially from the radial surface 15 of the base member 12 and circumferentially about the centerline $L_C$. Each conductive fiber 20 has a first axial end 20*a* coupled with the base member 12 and an opposing second axial end 20*b* engaged with the outer conductor 14.

As such, at least one conductive path extends from the rotatable shaft 2, through the outer conductor 14, the brush 16 and the base member 12, and to the fixed shaft 6. With the present grounding brush assembly 10, any electric charge accumulating on the rotatable shaft 2 flows as an electric current through the assembly 10 rather than passing through the bearing(s) 5 of the electric machine 1. Thereby, damage to the rolling elements and raceways (neither indicated) of the bearing(s) 5 is avoided. Having described the basic elements and functions above, these and other components of the present grounding brush assembly 10 are described in further detail below.

Figure 4:
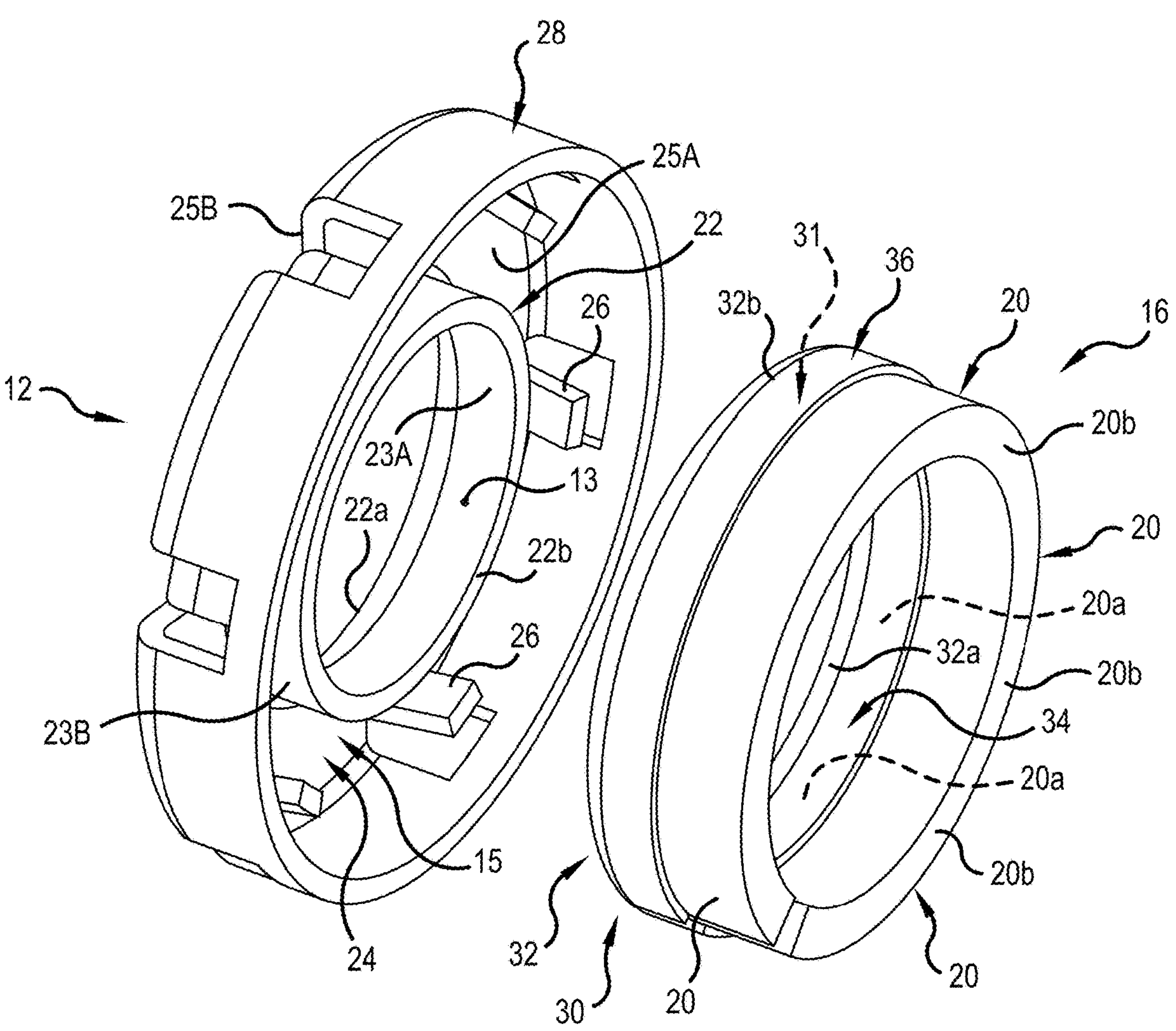
FIG. 4 is an exploded perspective view of the base member and brush of FIG. 3.
Figure 5:
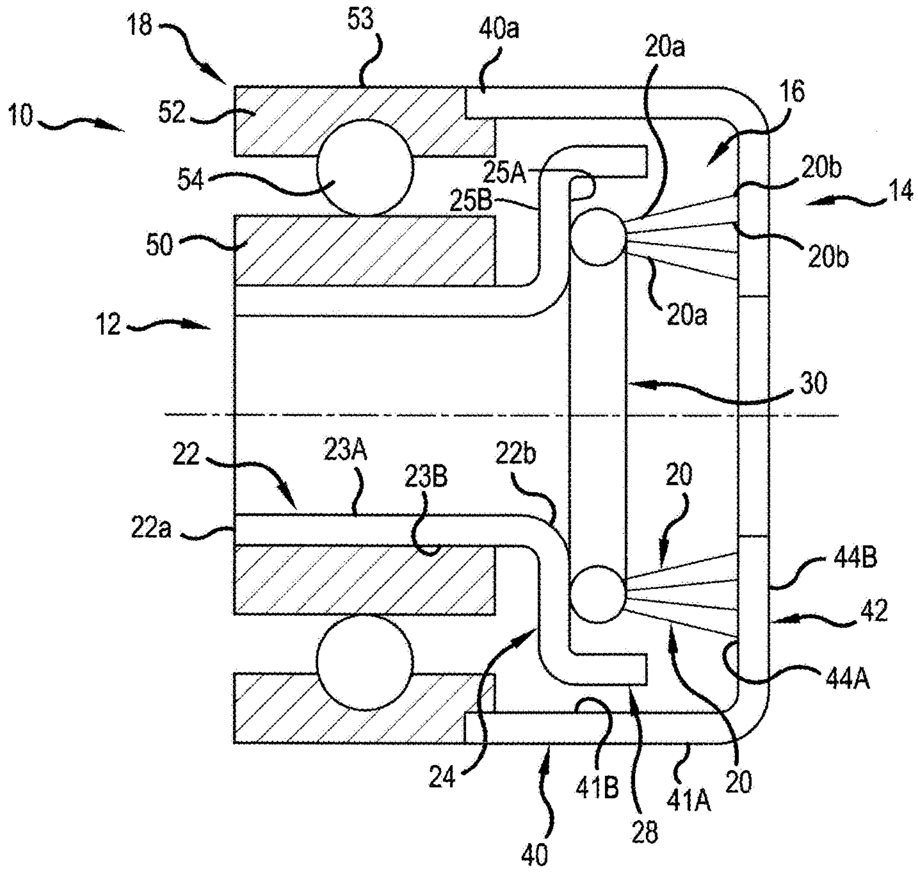
FIG. 5 is an axial cross-sectional view of a second construction of the grounding brush assembly, shown installed between an outer rotatable shaft and an inner fixed shaft.
Figure 6:
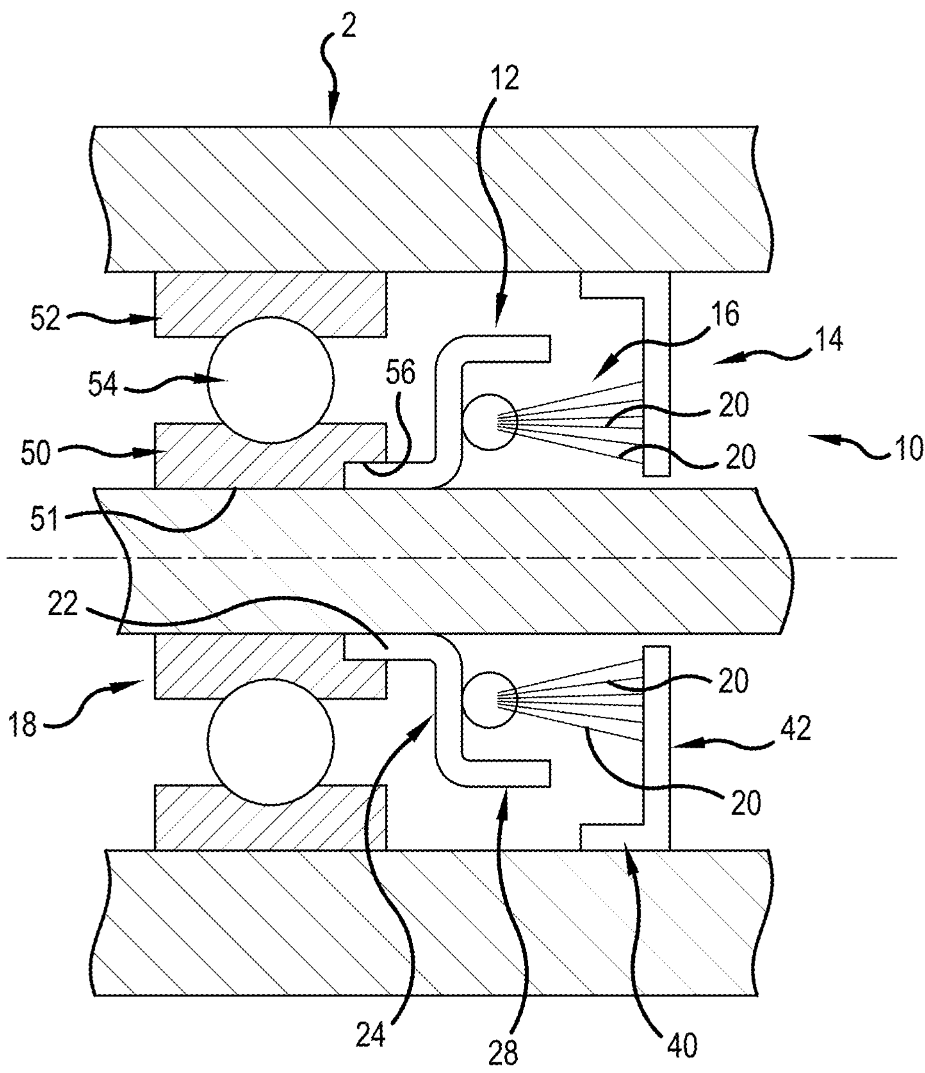
FIG. 6 is an axial cross-sectional view of a third construction of the grounding brush assembly, shown installed between an outer rotatable shaft and an inner fixed shaft.

Referring now to FIGS. 4-6, the base member 12 preferably includes an annular hub 22 and a radial flange 24 extending radially outwardly from the hub 22. More specifically, the annular hub 22 has an inner circumferential surface 23A providing the bore 13 of the base member 12, an opposing outer circumferential surface 23B, a first axial end 22*a* and an opposing second axial end 20*b*. The radial flange 24 extends radially outwardly from the outer circumferential surface 23B of the hub 22 and has an inner radial end 24*a* integrally formed with the hub 22, an opposing outer radial end 24*b*, a first radial surface 25A providing a mounting surface 15 for the conductive brush 16, and an opposing second radial surface 25B. Preferably, the radial flange 24 includes at least one and preferably a plurality of retainer tabs 26 spaced circumferentially about the centerline Le of the base member 12, each tab 26 being engaged with the brush 16 so as to couple or attach the brush 16 with the base member 12, as discussed in further detail below.

Further, each retainer tab 26 is preferably provided or formed by a cut and bent portion of the radial flange 24, which is preferably bent into engagement with the brush 16 as discussed below. Preferably, the conductive base member 12 further includes an annular cover portion 28 extending axially from the outer radial end 24*b* of the radial flange 24 so as to surround a portion of the conductive brush 16. Preferably, the base member 12 is formed of an electrically conductive material, such as steel, aluminum, a conductive polymer or any other appropriate conductive material, but may alternatively be formed of a non-conductive material that has been coated or treated with an electrically conductive coating.

Figure 3:
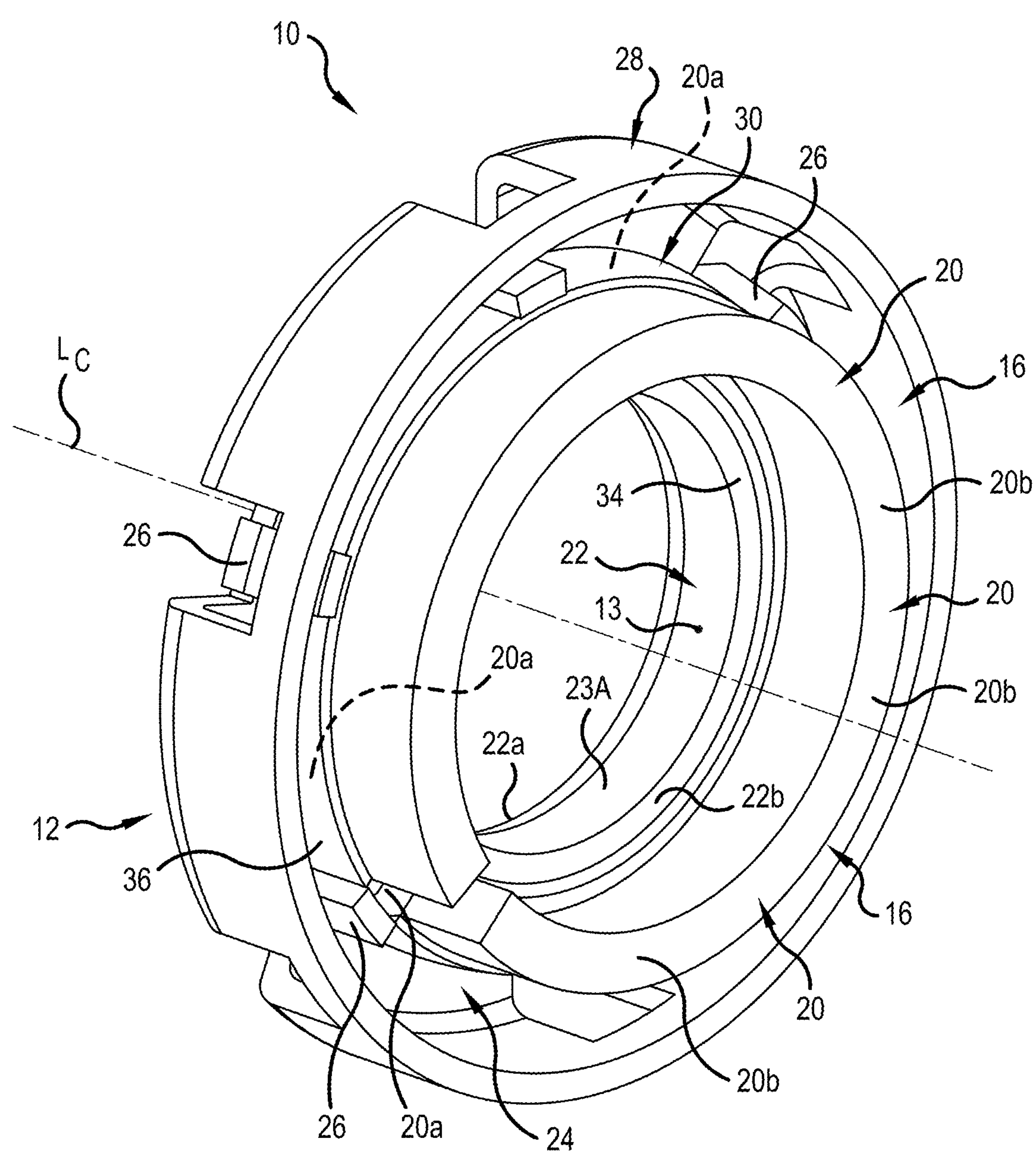
FIG. 3 is a perspective view of a base member and a brush of the first construction of FIG. 2.

Referring to FIGS. 3 and 4, the conductive brush 16 preferably includes an annular retainer 30 with a circumferential channel 31 (FIG. 4), each first axial end 20*a* of the plurality of conductive fibers 20 being disposed within the circumferential channel 31. More specifically, the retainer 30 preferably includes an annular base wall 32 with an inner radial end 32*a* and an outer radial end 32*b*, an annular inner side wall 34 extending axially from the inner radial end 32*a* of the base wall 32 and an annular outer side wall 36 extending axially from the outer radial end 32*b* of the base wall 32 and spaced radially outwardly from the inner side wall 34. With such a retainer structure, the one or more retainer tabs 26 of the radial flange 24 of the base member 12 are engaged with the outer side wall 36 of the brush retainer 30 so as to couple the brush 16 with the base member 12.

Further, the plurality of conductive fibers 20 are disposed between and engaged by the inner and outer side walls 34, 36, respectively, of the retainer 30 so as to retain the conductive fibers 20 within the annular channel 31. Preferably, the retainer 30 is formed of an electrically conductive material, such as steel, aluminum, a conductive polymer, etc., and each conductive fiber 20 is a strand of an electrically conductive material, preferably carbon, but may be formed of steel, aluminum, a conductive polymer, etc. However, the conductive brush 14 may alternatively be formed as either a single, solid annular conductor or a plurality of arcuate conductor segments spaced circumferentially apart, in either case being formed of an appropriate conductive material such as steel, a conductive polymer, etc.

Figure 2:
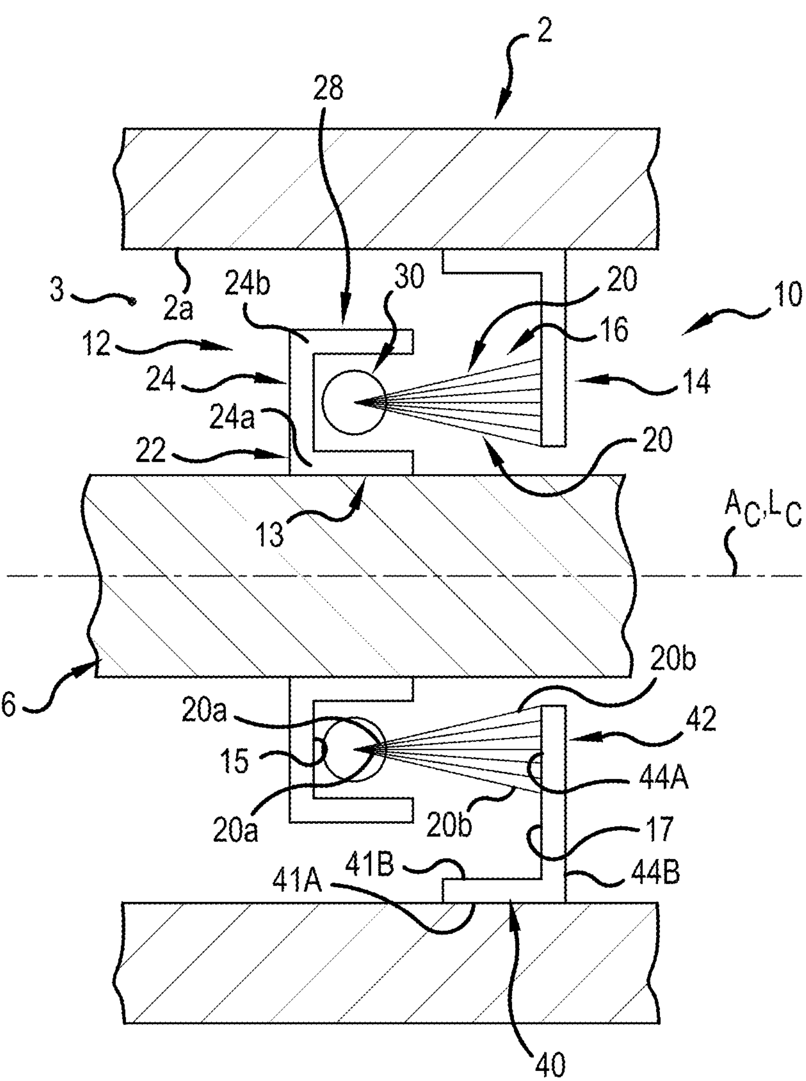
FIG. 2 is an axial cross-sectional view of a first construction of the grounding brush assembly, shown installed between an outer rotatable shaft and an inner fixed shaft.

Referring now to FIGS. 2, 5 and 6, the outer conductor 14 preferably includes an axial portion 40 engageable with the rotatable shaft 2 and a radial flange 42 extending radially inwardly from the axial portion 40. More specifically, the axial portion 40 has an outer circumferential surface 41A frictionally engageable with the inner circumferential surface 2*a* of the rotatable shaft 2, so as to couple the outer conductor 14 with the shaft 2, and an opposing inner circumferential surface 41B. The radial flange 42 has a first radial surface 44A providing a radial contact surface 17 engageable by the conductive fibers 20 of the conductive brush 16 and an opposing radial surface 44B. Being connectable with the rotatable shaft 2, the annular conductor 14 is rotatable about the central axis $A_C$ such that the second axial ends 20*b* of the plurality of conductive fibers 20 slide against the radial surface 17 of the conductor 14.

Referring to FIGS. 5 and 6, as discussed above, the grounding brush assembly 10 preferably includes at least one centering bearing 18 having an inner ring 50 disposed about the fixed shaft 6 and an outer ring 52 engaged with the inner circumferential surface 2*a* of the rotatable shaft 2. Preferably, each centering bearing 18 includes a plurality of rolling elements 54 disposed between the inner and outer rings 50, 52, but may alternatively be formed as a plain bearing (not shown). The at least one centering bearing 18 is disposed against or about, is spaced axially apart from the conductive base member 12 and the outer conductor 14, as discussed below. In any case, the one or more centering bearings 18 function to couple the rotatable shaft 2 with the fixed shaft 6 so as to stiffen and prevent vibration of the fixed shaft 6, and do not primarily serve to support any loading between the two shafts 2, 6.

Referring now to FIGS. 2-6, in certain constructions, the conductive base member 12 is generally C-shaped and is formed with the radial flange 24 extending radially outwardly from the first axial end 22*a* of the hub 22 and the cover portion 28 being spaced radially outwardly from the hub 22, as shown in FIGS. 2-4. In such a construction, the conductive brush 16 is generally enclosed between the hub 22 and the cover portion 28. In other constructions, the base member 12 is generally S-shaped and is formed with the radial flange 24 extending radially outwardly from the second axial end 22*b* of the hub 22, the hub 22 extending axially from the second radial surface 25B of the flange 24 and the cover portion 28 extending axially from the first radial surface 25A, as depicted in FIGS. 5 and 6.

Preferably, with a grounding brush assembly 10 having an S-shaped conductive base member 12, the inner ring 50 of the at least one centering bearing 18 is either disposed about the outer circumferential surface 23B of the hub 22 so as to couple the bearing 18 with the fixed shaft 6, as depicted in FIG. 5, or a portion of the hub 22 is disposed within an annular groove 56 extending radially outwardly from an inner circumferential surface 51 of the inner ring 50, as shown in FIG. 6. However, when the base member 12 is C-shaped as shown in FIGS. 2-4, the inner ring 50 of each of the one or more centering bearings 18 are spaced apart from or abut against the base member 12. Further, the axial portion 40 of the outer conductor 14 may be spaced axially apart from the outer ring 52 of the at least one centering bearing 18, as shown in FIG. 6, abut against the outer ring 52 (not shown), or have at least a section 40*a* disposed about at least a portion of the outer ring 52, as depicted in FIG. 5.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded, the grounding brush assembly comprising:

an annular inner conductive base member having a bore sized to receive a portion of the fixed shaft and a centerline coaxially alignable with the central axis;

an annular outer conductor engageable with the inner circumferential surface of the rotatable shaft; and a conductive brush coupled with the conductive base member and including a plurality of conductive fibers extending axially along and circumferentially about the centerline, each conductive fiber having a first axial end coupled with the base member and an opposing second axial end engaged with the outer conductor such that at least one conductive path extends from the rotatable shaft, through the outer conductor, the brush and the base member, and to the fixed shaft.

2. The grounding brush assembly as recited in claim 1, wherein the conductive base member includes an annular hub having an inner circumferential surface providing the bore of the base member and a radial flange extending radially outwardly from the hub, the conductive brush being attached to the radial flange of the base member.

3. The grounding brush assembly as recited in claim 2, wherein the outer conductor includes an axial portion engageable with the rotatable shaft so as to couple the outer conductor with the rotatable shaft and a radial flange extending radially inwardly from the axial portion, the second axial end of each one of the plurality of conductive fibers of the conductive brush being engaged with the radial flange of the outer conductor.

4. The grounding brush assembly as recited in claim 2, wherein:

the conductive brush includes an annular retainer with a circumferential channel, the first axial end of each one of the plurality of conductive fibers being disposed within the circumferential channel; and the radial flange of the conductive base member includes at least one retainer tab engaged with the annular retainer of the conductive brush to couple the brush with the base member.

5. The grounding brush assembly as recited in claim 4, wherein the retainer of the conductive brush includes an annular base wall with an inner radial end and an outer radial end, an annular inner side wall extending axially from the inner radial end of the base wall and an annular outer side wall extending axially from the outer radial end of the base wall and spaced radially outwardly from the inner side wall, the plurality of conductive fibers being disposed between and engaged by the inner and outer side walls so as to retain the conductive fibers within the annular channel.

6. The grounding brush assembly as recited in claim 5, wherein the at least one retainer tab of the radial flange of the base member includes a plurality of retainer tabs spaced circumferentially about the centerline of the base member, each retainer tab being engaged with the outer side wall of the retainer of the conductive brush.

7. The grounding brush assembly as recited in claim 4, wherein the conductive base member includes a plurality of the retainer tabs spaced circumferentially about the centerline of the base member, each retainer tab being provided by a cut and bent portion of the radial flange.

8. The grounding brush assembly as recited in claim 2, wherein the radial flange of the conductive base member has an outer radial end and the base member further includes an annular cover portion extending axially from the outer radial end of the radial flange.

9. The grounding brush assembly as recited in claim 1, wherein the outer conductor includes an axial portion engageable with the rotatable shaft so as to couple the outer conductor with the rotatable shaft and a radial flange extending radially inwardly from the axial portion, the second axial end of each one of the plurality of conductive fibers of the conductive brush being engaged with the radial flange of the outer conductor.

10. The grounding brush assembly as recited in claim 1, further comprising at least one centering bearing having an inner ring disposable about the fixed shaft and an outer ring engaged with the inner circumferential surface of the rotatable shaft, the at least one centering bearing being disposed against or spaced axially apart from the conductive base member.

11. The grounding brush assembly as recited in claim 10, wherein the conductive base member includes an annular hub having an inner circumferential surface providing the bore of the base member and being disposable about the fixed shaft, the inner ring of the centering bearing being disposed about a portion of the annular hub so as to couple the centering bearing with the fixed shaft.

12. The grounding brush assembly as recited in claim 10, wherein the outer conductor includes an axial portion engageable with the rotatable shaft so as to couple the outer conductor with the rotatable shaft, at least a section of the axial portion being disposed about at least a portion of the outer ring of the centering bearing.

13. A grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded, the grounding brush assembly comprising:

an annular inner conductive base member having an annular hub, the hub having a bore sized to receive a portion of the fixed shaft and a centerline coaxially alignable with the central axis, and a radial flange extending radially outwardly from the annular hub;

an annular outer conductor having an axial portion engageable with the inner circumferential surface of the rotatable shaft so as to couple the outer conductor with the rotatable shaft and a radial flange extending radially inwardly from the axial portion; and a conductive brush coupled with the conductive base member and including a plurality of conductive fibers extending axially along and circumferentially about the centerline, each conductive fiber having a first axial end coupled with the radial flange of the base member and an opposing second axial end engaged with the radial flange of the outer conductor such that at least one conductive path extends from the rotatable shaft, through the outer conductor, the brush and the base member, and to the fixed shaft.

14. The grounding brush assembly as recited in claim 13, wherein:

the conductive brush includes an annular retainer with a circumferential channel, the first axial end of each one of the plurality of conductive fibers being disposed within the circumferential channel; and the radial flange of the conductive base member includes at least one retainer tab engaged with the annular retainer of the conductive brush to couple the brush with the base member.

15. The grounding brush assembly as recited in claim 14, wherein the retainer of the conductive brush includes an annular base wall with an inner radial end and an outer radial end, an annular inner side wall extending axially from the inner radial end of the base wall and an annular outer side wall extending axially from the outer radial end of the base wall and spaced radially outwardly from the inner side wall, the plurality of conductive fibers being disposed between and engaged by the inner and outer side walls so as to retain the conductive fibers within the annular channel.

16. The grounding brush assembly as recited in claim 15, wherein the at least one retainer tab of the radial flange of the base member includes a plurality of retainer tabs spaced circumferentially about the centerline of the base member, each retainer tab being engaged with the outer side wall of the retainer of the conductive brush.

17. The grounding brush assembly as recited in claim 14, wherein the at least one retainer tab of the conductive base member includes a plurality of the retainer tabs spaced circumferentially about the centerline of the base member, each retainer tab being provided by a cut and bent portion of the radial flange.

18. The grounding brush assembly as recited in claim 13, wherein the radial flange of the conductive base member has an outer radial end and the base member further includes a cover portion extending axially from the outer radial end of the radial flange.

19. The grounding brush assembly as recited in claim 13, further comprising at least one centering bearing having an inner ring disposable about the fixed shaft and an outer ring engaged with the inner circumferential surface of the rotatable shaft, the at least one centering bearing being disposed against or spaced axially apart from the conductive base member.

20. The grounding brush assembly as recited in claim 19, wherein at least one of:

the inner ring of the centering bearing is disposed about a portion of the annular hub so as to couple the centering bearing with the fixed shaft; and at least a section of the axial portion of the outer conductor is disposed about at least a portion of the outer ring of the centering bearing.

* * * * *